(12) United States Patent
Vogel

(10) Patent No.: US 12,569,922 B1
(45) Date of Patent: Mar. 10, 2026

(54) SUBMERGED FAST WIRE ELECTRICAL DISCHARGE MACHINING

(71) Applicant: EDM Network, Inc., Sugar Grove, IL (US)

(72) Inventor: Ron C. Vogel, Sugar Grove, IL (US)

(73) Assignee: EDM Network, Inc., Sugar Grove, IL (US)

( * ) Notice: Subject to any disclaimer, the term of this patent is extended or adjusted under 35 U.S.C. 154(b) by 638 days.

(21) Appl. No.: 18/100,226

(22) Filed: Jan. 23, 2023

(51) Int. Cl.
| | |
|---|---|
| *B23H 7/10* | (2006.01) |
| *B23H 1/06* | (2006.01) |
| *B33Y 40/20* | (2020.01) |

(52) U.S. Cl.
CPC ................. *B23H 7/10* (2013.01); *B23H 1/06* (2013.01); *B33Y 40/20* (2020.01)

(58) Field of Classification Search
CPC .......... B23H 1/00; B23H 7/02; B23H 11/003; B23H 2500/20; B23H 7/04; B23H 7/065; B23H 7/105; B23H 7/26; B23H 1/028; B23H 11/00; B23H 7/06; B23H 1/02; B23H 7/10; B23H 7/102; B23H 7/108; B23H 7/18; B23H 7/20; B22F 10/28; B22F 10/20; B22F 10/30; B22F 10/43; B22F 10/47; B22F 10/66; B22F 12/49; B22F 12/70; B22F 12/90; B22F 2003/1042; B22F 2007/068; B22F 5/04; B22F 7/062; B33Y 30/00; B33Y 80/00; B33Y 10/00; B33Y 40/20; B33Y 50/02; G05B 2219/45043; G05B 19/401; G05B 19/40937; G05B 2219/4522; B23K 26/34; B23K 26/354

USPC .......................................................... 219/69
See application file for complete search history.

(56) References Cited

U.S. PATENT DOCUMENTS

| | | | | |
|---|---|---|---|---|
| 11,760,031 B1 * | 9/2023 | Nagel | .................... | B33Y 40/20 |
| | | | | 219/69.12 |
| 2008/0058986 A1 * | 3/2008 | Moldenhauer | ......... | B23H 11/00 |
| | | | | 700/245 |

OTHER PUBLICATIONS

Li, CN 204035093 U (Year: 2014).*
Nagai, JP 2000015522 (Year: 2000).*
Katogi, WO 2018008133 (Year: 2018).*

* cited by examiner

*Primary Examiner* — Vy T Nguyen
(74) *Attorney, Agent, or Firm* — Spencer Fane LLP; Steven J. Laureanti

(57) ABSTRACT

A system and method are disclosed for submerged wire EDM. The system includes a workpiece, a build plate, and a carrier plate, and a portable cart with rails supporting the carrier plate. The cart rails rotate the carrier plate into an inverted position via gravity. The cart includes a powered lift for positioning the carrier plate for loading. The EDM machine includes a support positioned at a height for loading of the inverted carrier plate from the portable build plate cart, a clamping system to secure the loaded carrier plate, an EDM cutting wire, a cutting unit that when driven by a servo motor moves the reciprocating cutting wire across a face of the inverted build plate; and a submersion tank containing water to submerge the workpiece so that when parts are cut from the inverted build plate, the parts fall to the bottom of the submersion tank.

20 Claims, 6 Drawing Sheets

SUBMERGED FAST WIRE ELECTRICAL DISCHARGE MACHINING

TECHNICAL FIELD

The present disclosure relates generally to metal machining equipment and more particularly to wire electrical discharge machining.

BACKGROUND

Additive manufacturing, also sometimes called "3D printing," is a process to produce various materials, generally used to produce a physical reproduction of a 3D model. Additive manufacturing allows for the production of very complex pieces which would be difficult to produce using traditional methods. As additive manufacturing technology has improved, larger and heavier metal pieces can now be produced. However, these larger and heavier pieces have brought additional challenges, such as quickly and easily separating the manufactured pieces from the attached build plate. Wire electrical discharge machining (EDM) is a machining process which can quickly and accurately cut any electrically conductive metal using electrical discharges. Existing wire EDM tools are inadequate for separating additively manufactured metal pieces from build plates. For example, existing brass wire EDM machines rely on high pressure flushing to cut fast, while reusable molybdenum wire EDMs use cumbersome rotary tables to invert the build plate. Such machines also require water additives to support submerged cutting which adds to the cost and difficulty of operating such machines. Additionally, the water additive requires additional cleaning operations to remove the additive materials. Thus, existing EDM machines rely on expensive and slow machining processes in order to separate manufactured pieces from build plates, which is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 3 illustrates an inverted Fast Wire EDM machine in housing, according to an embodiment.

DETAILED DESCRIPTION

Figure 1:
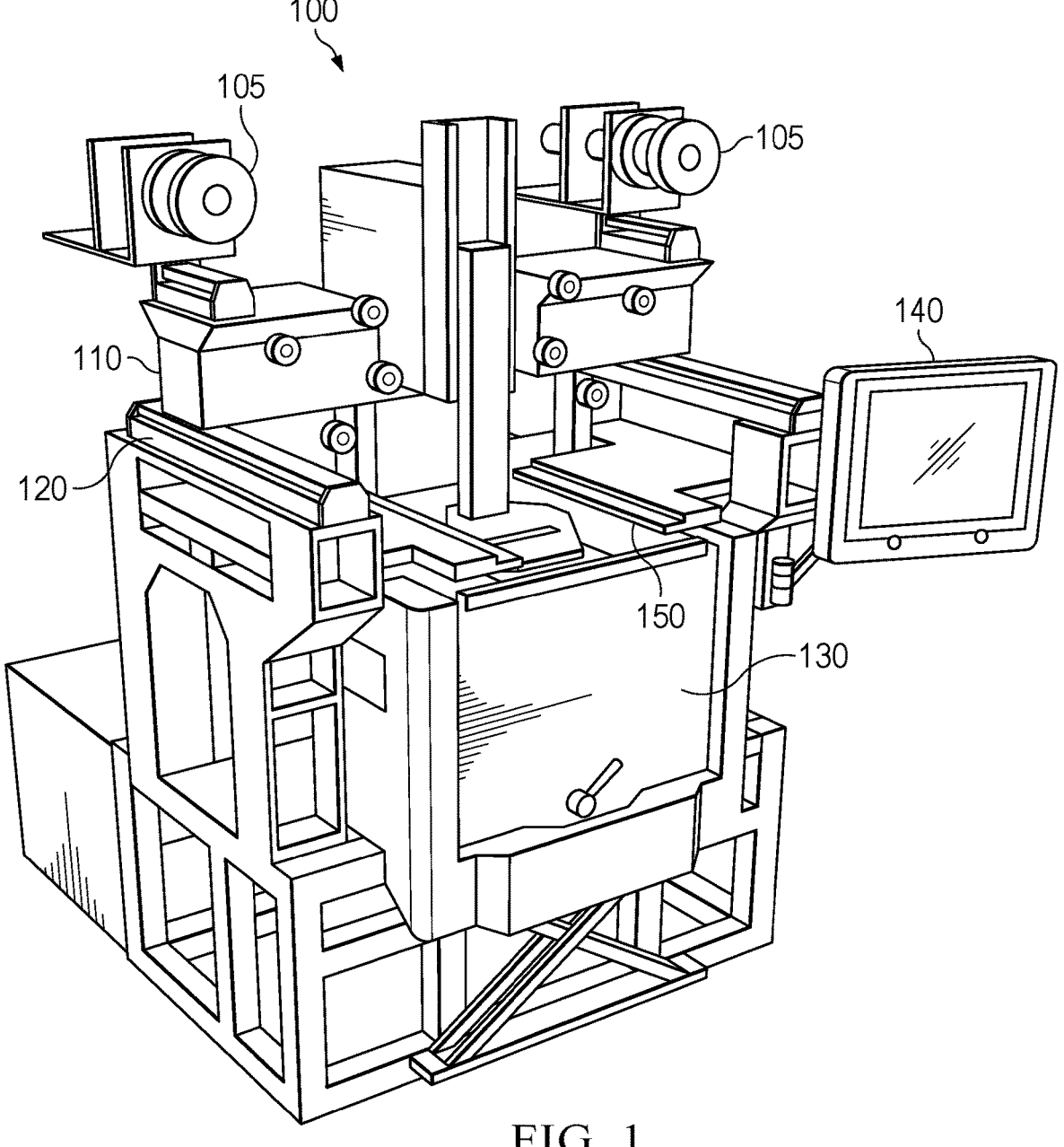
FIG. 1 illustrates a perspective view of an inverted Fast Wire EDM machine, according to an embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Embodiments provide and electrical discharge machining (EDM) machine with an inverted build plate so that 3D printed parts, when cut, fall into a water tank to prevent damage to the 3D printed parts. The build plate of the EDM machine is loaded upside down. In embodiments, the EDM machine uses brass wire or molybdenum wire, in small diameter, and can reuse either wire using a system spun off of dual drums. Embodiments provide an EDM machine which supports fast cutting by re-using wire effectively to reduce operator costs. Embodiments provide an EDM machine that cuts without a water additive, using only pure deionized water, and can cut with either AC or DC power. Embodiments provide an EDM machine which can support cutting 3D printed pieces of up to 80 kilograms, and which takes up a small amount of space compared to existing EDM machines.

Existing inverted cutting machines use a built-in rotary table to place the build plate in an inverted position, which requires costly and complicated extra parts, compared to embodiments. According to embodiments, the EDM machine described herein may use gravity to load an already inverted build plate into an EDM machine without requiring a rotary table. Embodiments provide an EDM machine which locates off the face of the build plate while existing machines locate off of the back of the build plate. Embodiments provide an EDM machine which cuts with a 0.012" brass wire and no water additive, while existing EDM machines cut with a 0.008" diameter molybdenum wire and must use a water additive.

FIG. 1 illustrates a perspective view of inverted fast wire EDM machine 100, according to an embodiment. Inverted fast wire EDM machine 100 includes wire transport 110, Y cutting axis 120, submersion tank 130 and control panel 140. Wire transport 110 contains a cutting wire, which may be a brass or molybdenum wire. In embodiments, the cutting wire may be exchangeable between a brass wire or a molybdenum wire. Y cutting axis 120 is controlled by AC servo. Submersion 130 includes a trap door and is used to hold a quantity of water to be used for submerged cutting, as described in further detail below. Submersion tank 130 also allows for 3D printed parts, when loaded on an inverted build plate, to be cut by inverted fast wire EDM machine 100 and sink slowly to the bottom of submersion tank 130 without damaging the 3D printed parts. Control panel 140 features an exclusive controller using software and hardware design technology, which has the ability of a full controller production process, allowing for rapid rationalization. Existing EDM systems rely on external controls and that cannot be fully integrated. Control panel 140 enables rapid servo response and fine precise control of the AC or DC power supply.

Inverted Fast Wire EDM machine 100 features a unique build plate loading system. Inverted Fast Wire EDM machine 100 loads a build plate inverted using gravity rather than a rotary indexer. Inverted Fast Wire EDM machine 100 locates the build plate off of the precision "face" of the build plate for better accuracy.

Inverted Fast Wire EDM machine 100 has a dual spooler design 105. The cutting wire is run through wire housing 110. Dual spoolers 105 can be rethreaded by one person in about 10 minutes. Wire moving for cutting can be moved by changing the Z axis up or down to select the cutting plane. The EDM machine supports 400 mm for moving Y axis, 400 mm for X clearance, and 300 mm for moving Z axis.

Figure 2:
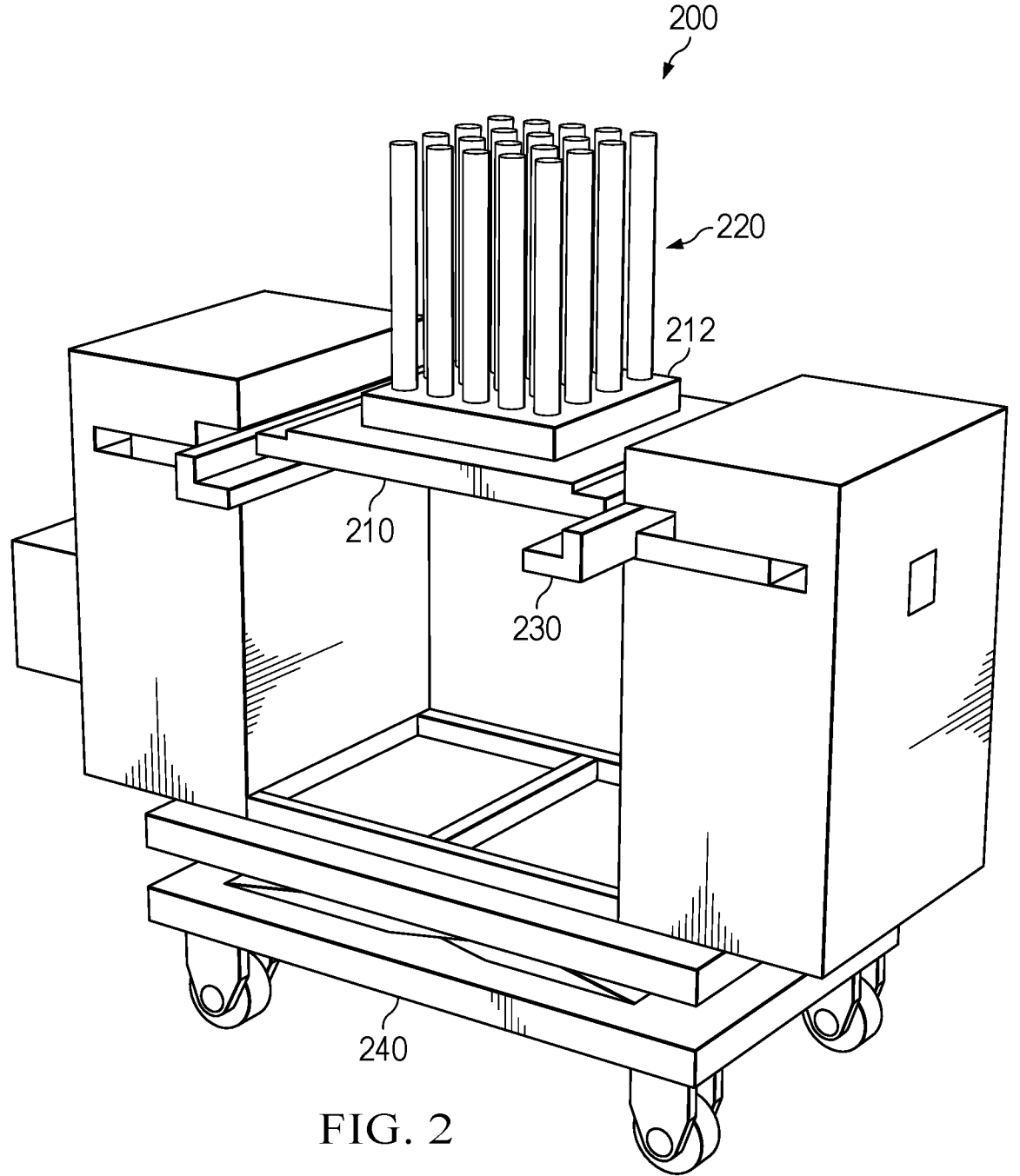
FIG. 2 illustrates a portable build plate cart, according to an embodiment.

FIG. 2 illustrates portable build plate cart 200, according to an embodiment. Portable build plate cart 200 comprises carrier plate 210, build plate 212, one or more 3D printed parts 220, build plate rail 230 and cart 240. Portable build plate cart 200 may be used to transport and load build plates, such as build plate 212, into inverted EDM machines, such as inverted fast wire EDM machine 100 of FIG. 1. In this example, carrier plate 210 is moved in an upright position, but is inverted, with build plate 212 being above one or more 3D printed parts 220, when loaded into an EDM machine for cutting. Once inverted by gravity and secured to lock in carrier plate 210, a powered scissor lift raises carrier plate 210 to slide it into carrier plate support 150. There it is secured by precision pins for location.

Figure 3:
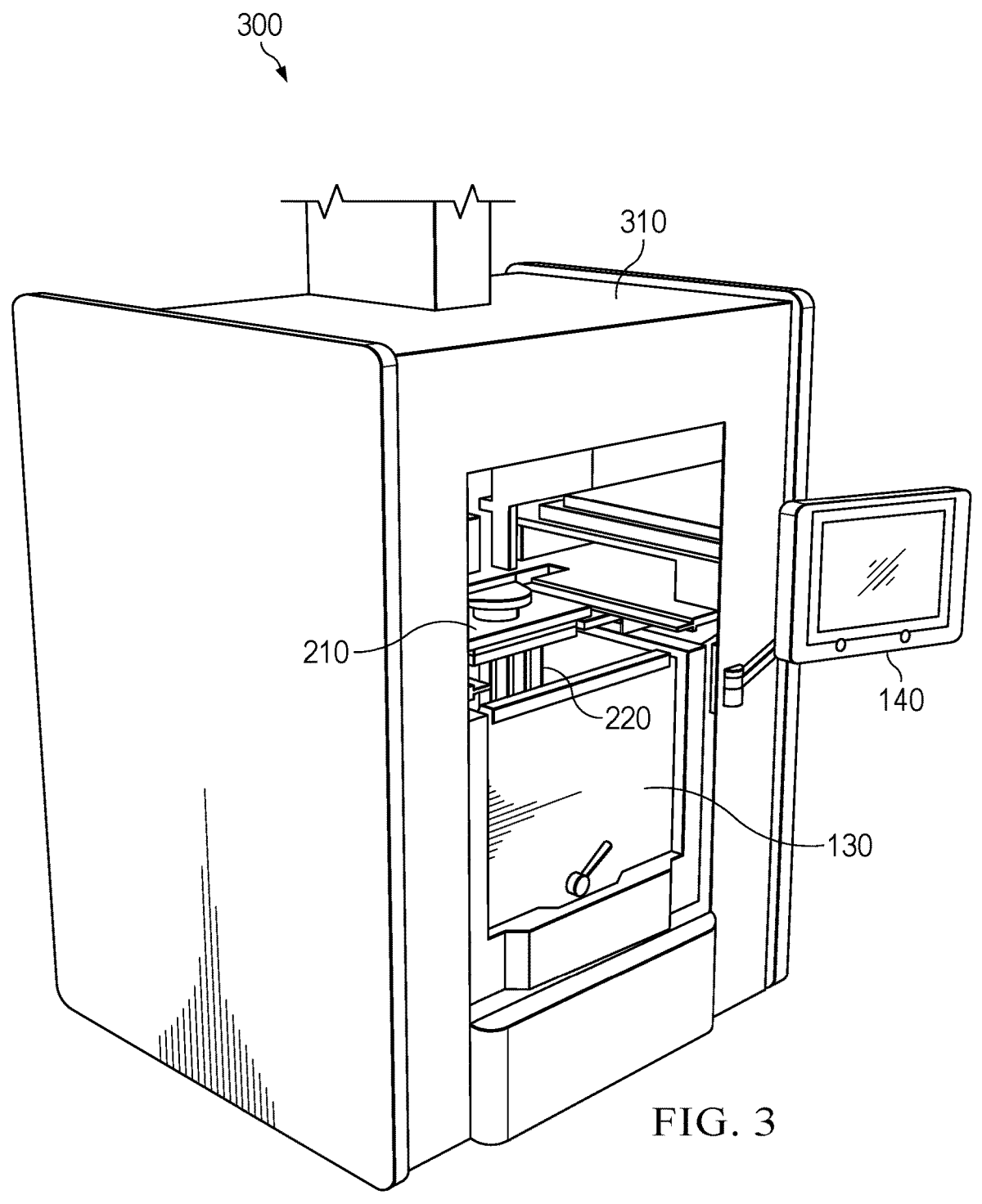

FIG. 3 illustrates EDM machine in housing 300, according to an embodiment. EDM machine in housing 300 may be inverted Fast Wire EDM machine 100 of FIG. 1 encased in a safety housing 310. EDM machine in housing 300 includes submersion tank 130 and control panel 140, as discussed above. EDM machine in housing 300 has a compact design compared to existing EDM machines, which saves footprint in a workshop and allows for easy loading and unloading. In this embodiment, EDM machine in housing 300 has been loaded with build plate 210 inverted, with one or more 3D printed parts 220 underneath within submersion tank 130.

Figure 4A:
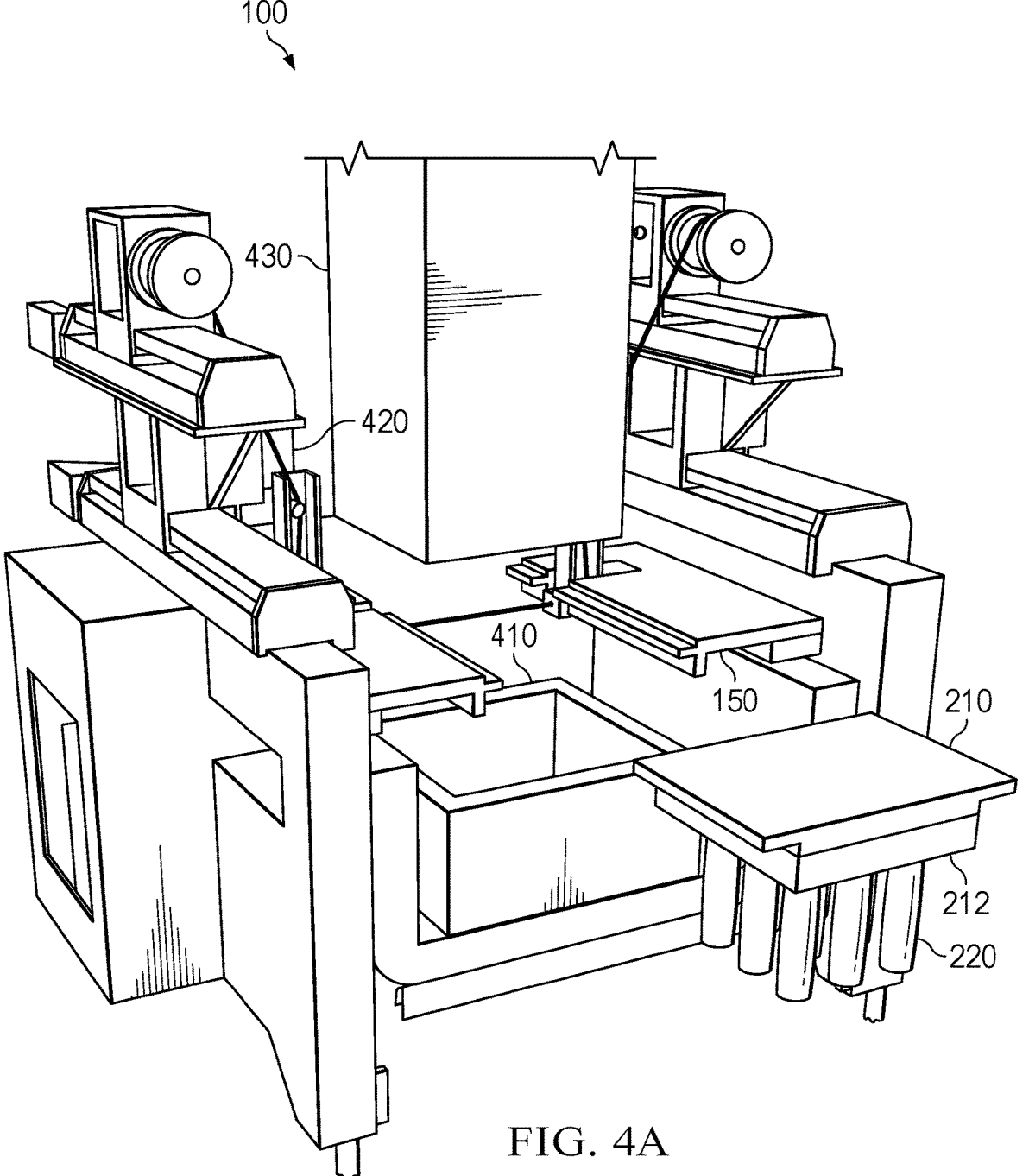
FIGS. 4A-4C illustrate an inverted Fast Wire EDM machine performing a method to cut an inverted build plate, according to an embodiment.
Figure 4B:
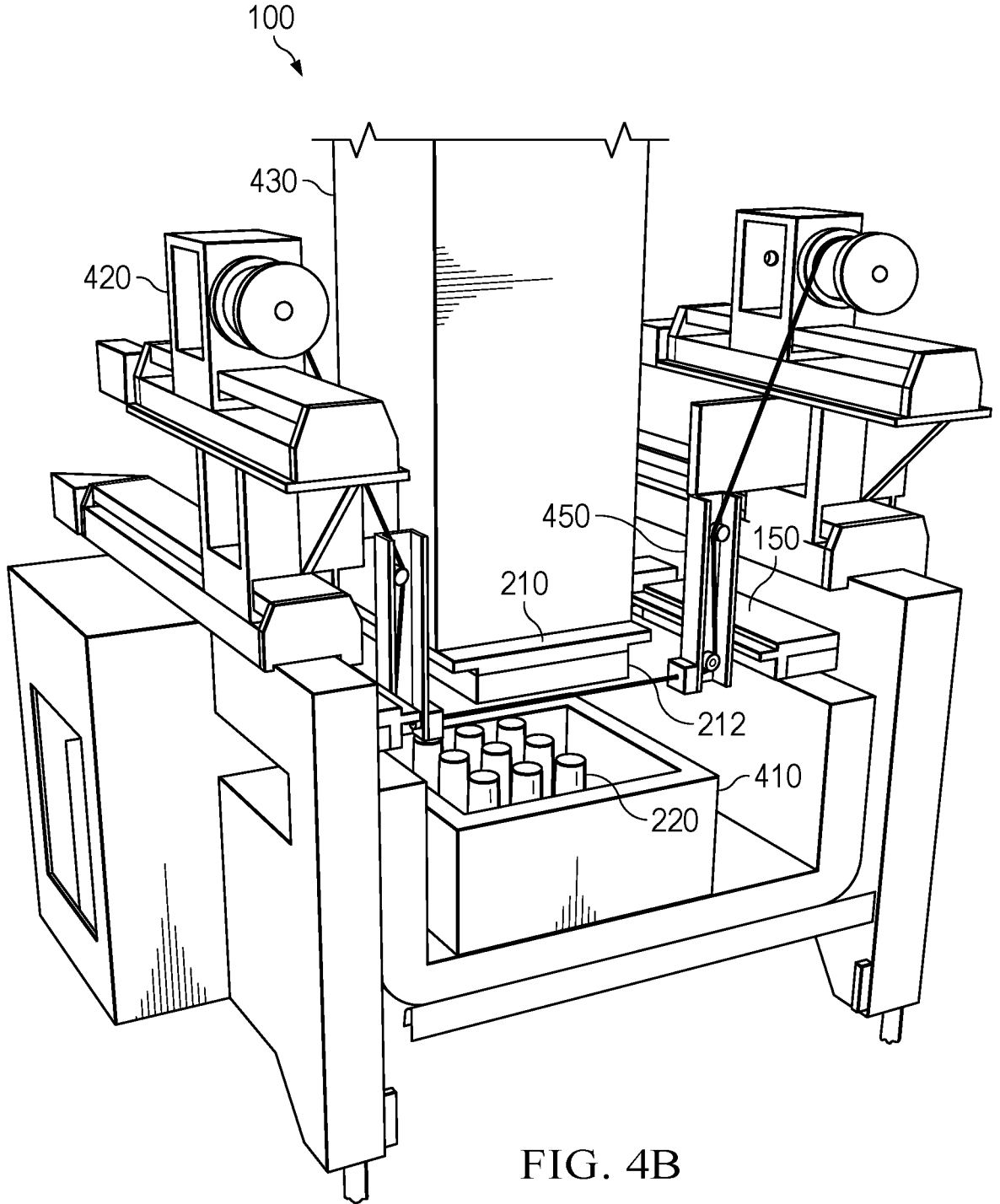
Figure 4C:
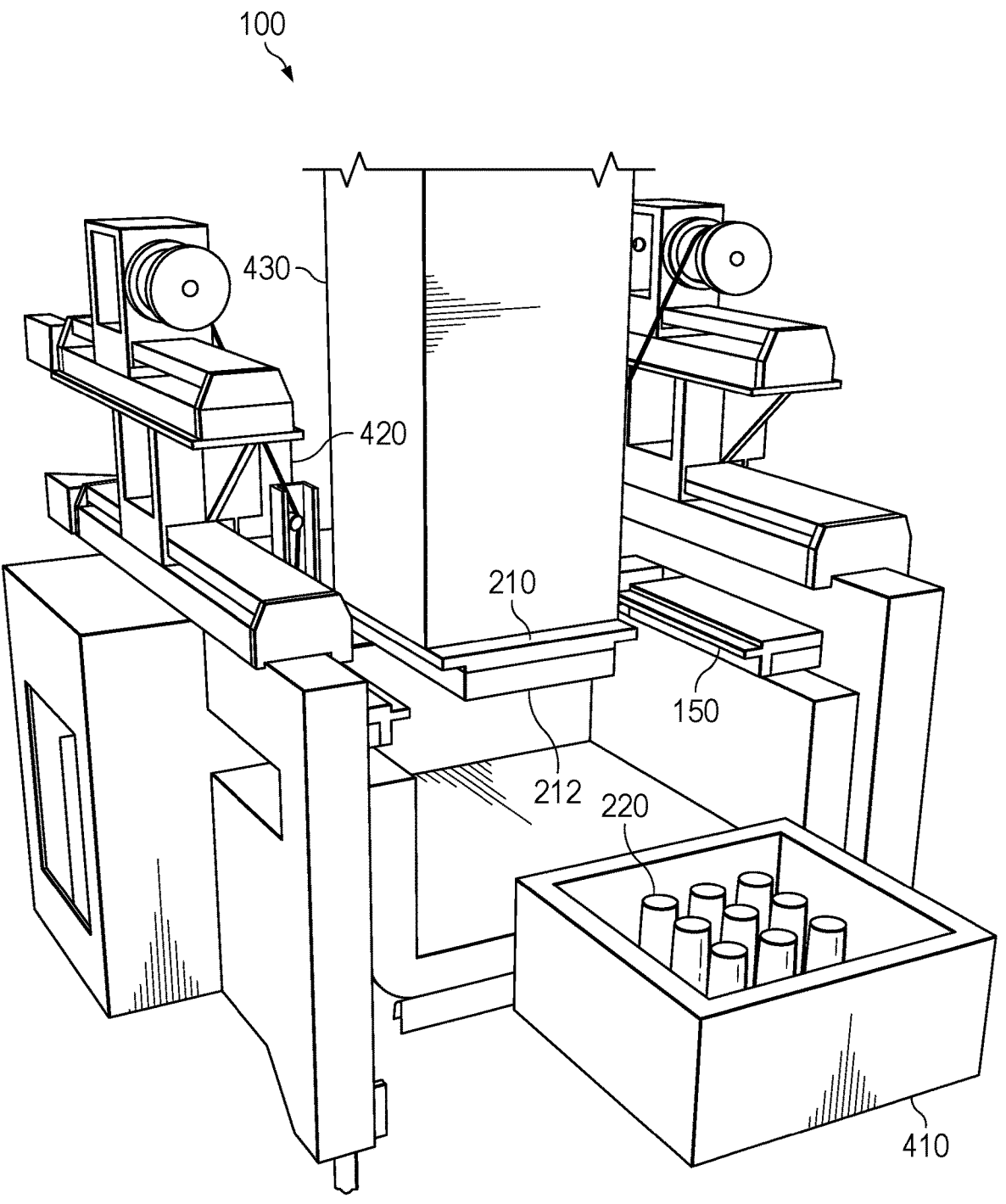

FIGS. 4A-4C illustrate inverted Fast Wire EDM machine 100 performing a method to cut an inverted build plate, according to an embodiment. FIG. 4A shows inverted Fast Wire EDM machine 100 just before carrier plate 210 is loaded. Inverted Fast Wire EDM machine 100 includes deionized water 410, cutting wire 420, Z axis unit 430 and carrier plate support 150. As part of the method to cut an inverted build plate, carrier plate support 150 is extended inward to the width of carrier plate 210. Then, carrier plate 210 is moved into submersion tank 130, supported by carrier plate support 150. Then, Z axis unit 430 moves down and is secured to carrier plate 210.

FIG. 4B shows inverted fast wire EDM machine 100 after carrier plate 210 has been inserted. Continuing the method to cut an inverted build plate, after Z axis unit 430 is secured to carrier plate 210, Z axis unit 430 is adjusted to the proper height for cutting one or more 3D printed parts 220 from build plate 212. Then, carrier plate support 150 returns to its original position, allowing Y axis wire transport 450 to move forward, which brings cutting wire 420 forward. Cutting wire 420 is reciprocated back and forth between the dual spools to effect cutting one or more 3D printed parts 220 from build plate 210.

FIG. 4C shows inverted Fast Wire EDM machine 100 after build plate 212 has been cut from one or more 3D printed parts 220, and one or more 3D printed parts 220 has been removed from inverted fast wire EDM machine 100.

In embodiments, inverted Fast Wire EDM machine 100 features a clamping system. The clamping system uses zero-point clamping to clamp a build plate attached to carrier plate 210 (such as build plate 212) in a labor-saving way to ensure part cutting accuracy. The clamping system makes numerical control of inverted Fast Wire EDM machine 100 more stable. The clamping mechanism includes precision pins to locate carrier plate 210, in a stainless-steel environment, which increases the life of inverted Fast Wire EDM machine 100 and enables inverted Fast Wire EDM machine 100 to work in a pure water environment, that is, without water additives.

The cutting position of inverted Fast Wire EDM machine 100 can be adjusted through the lifting and lowering of a precision adjustment mechanism in the Z-axis unit. Inverted Fast Wire EDM machine 100 features automatic alignment of a cutting wire to the face of the build plate.

In embodiments, inverted Fast Wire EDM machine 100 features a ball screw drive system. The use of wire rails and molybdenum wires with small diameters achieves an accuracy of plus or minus 0.1 mm, minimizes friction, wear and vibration, shows high-precision cutting and low-cost processing.

In embodiments, inverted Fast Wire EDM machine 100 features a tension control system. Using a servo motor to control the tension and speed of brass or molybdenum cutting wire, it is easier to manually replace the wire.

Reference in the foregoing specification to "one embodiment," "an embodiment," or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. An inverted wire electrical discharge machining system, comprising:
   a build plate attached to a carrier plate, the build plate further comprising a workpiece;
   a portable build plate cart comprising build plate rails supporting the carrier plate, the build plate rails further rotatable around an axis to position the carrier plate into an inverted position, wherein the portable build plate cart further comprises a powered scissor lift to adjust a height of the inverted carrier plate for loading into an inverted wire EDM machine; and
   the inverted wire EDM machine comprising:
      a carrier plate support positioned at a height to provide sliding support along a single axis for loading of the inverted carrier plate from the portable build plate cart;
      a Z-axis unit comprising a clamping system to secure the loaded, inverted carrier plate;
      a reciprocating cutting wire spooled between two drums through wire guides, wherein during operation the reciprocating cutting wire is pulsed with electric current to erode a surface of the workpiece attached to the inverted build plate;
      a Y-axis wire transport movable along a single axis when driven by a servo motor to move the reciprocating cutting wire across a face of the inverted build plate; and
      a submersion tank containing deionized water to submerge the workpiece and the face of the inverted build plate, wherein when cut from the inverted build plate by the reciprocating cutting wire, one or more parts of the workpiece fall from the inverted build plate to the bottom of the submersion tank.

2. The inverted wire electrical discharge machining system of claim 1, wherein the reciprocating cutting wire comprises brass or molybdenum wire.

3. The inverted wire electrical discharge machining system of claim 1, wherein the carrier plate is inverted by the portable build plate cart via gravity.

4. The inverted wire electrical discharge machining system of claim 1, wherein the inverted wire EDM machine locates the build plate off a face of the build plate.

5. The inverted wire electrical discharge machining system of claim 1, wherein the reciprocating cutting wire comprises brass and wherein the deionized water contains no additive.

6. The inverted wire electrical discharge machining system of claim 1, wherein the submersion tank further comprises a movable door that permits loading of the inverted carrier plate and provides filling the submersion tank with deionized water to submerge the face of the inverted build plate.

7. The inverted wire electrical discharge machining system of claim 1, wherein the clamping system comprises pins to locate the inverted carrier plate.

8. The inverted wire electrical discharge machining system of claim 1, wherein a cutting position of the reciprocating cutting wire is adjusted through lifting or lowering the Z-axis unit.

9. The inverted wire electrical discharge machining system of claim 1, wherein a tension and a speed of the reciprocating cutting wire is controlled via the servo motor.

10. The inverted wire electrical discharge machining system of claim 1, wherein the current of the reciprocating cutting wire comprises either AC or DC.

11. A method for separating one or more parts of a workpiece from a build plate, comprising:

manufacturing, using a 3D printing process, the workpiece, wherein the workpiece is attached to the build plate;

attaching the build plate to a carrier plate, and placing the carrier plate onto a portable build plate cart, the portable build plate cart comprising build plate rails supporting the carrier plate, the build plate rails further rotatable around an axis to position the carrier plate into an inverted position, wherein the portable build plate cart further comprises a powered scissor lift to adjust a height of the inverted carrier plate for loading into an inverted wire EDM machine;

rotating the carrier plate from an upright into an inverted position in the portable build plate cart; and sliding the inverted carrier plate from the portable build plate cart along a single axis into the inverted wire EDM machine, the inverted wire EDM machine comprising:

a carrier plate support positioned at a height to provide sliding support along a single axis for loading of the inverted build plate from the portable build plate cart;

a Z-axis unit comprising a clamping system to secure the loaded, inverted carrier plate;

a reciprocating cutting wire spooled between two drums through wire guides, wherein during operation the reciprocating cutting wire is pulsed with electric current to erode a surface of the workpiece attached to the inverted build plate;

a Y-axis wire transport movable along a single axis when driven by a servo motor to move the reciprocating cutting wire across a face of the inverted build plate; and a submersion tank containing deionized water to submerge the workpiece and the face of the inverted build plate; and operating the inverted wire EDM machine to separate one or more parts of the workpiece from the inverted build plate, wherein the separated parts fall to the bottom of the submersion tank.

12. The method of claim 11, wherein the reciprocating cutting wire comprises brass or molybdenum wire.

13. The method of claim 11, wherein the carrier plate is inverted by the portable build plate cart via gravity.

14. The method of claim 11, wherein the inverted wire EDM machine locates the build plate off a face of the build plate.

15. The method of claim 11, wherein the reciprocating cutting wire comprises brass or molybdenum and wherein the deionized water contains no additive.

16. The method of claim 11, wherein the submersion tank further comprises a movable door that permits loading of the inverted carrier plate and provides filling the submersion tank with deionized water to submerge the face of the inverted build plate.

17. The method of claim 11, wherein the clamping system comprises pins to locate the inverted carrier plate.

18. The method of claim 11, wherein a cutting position of the reciprocating cutting wire is adjusted through lifting or lowering the Z-axis unit.

19. The method of claim 11, wherein a tension and a speed of the reciprocating cutting wire is controlled via the servo motor.

20. The method of claim 11, wherein the current of the reciprocating cutting wire comprises either AC or DC.

* * * * *